United States Patent [19]
Allen

[11] 3,870,928
[45] Mar. 11, 1975

[54] VOLTAGE MONITORING SYSTEM

[76] Inventor: Melvin O. Allen, 1408 4th Ave., Canyon, Tex. 79015

[22] Filed: Jan. 31, 1974

[21] Appl. No.: 438,199

Related U.S. Application Data

[60] Division of Ser. No. 346,262, March 30, 1972, Pat. No. 3,815,062, which is a continuation of Ser. No. 171,862, Aug. 16, 1971, abandoned.

[52] U.S. Cl.................... 317/13 R, 317/22, 317/31, 317/36 TD
[51] Int. Cl. ........................................... H02h 7/09
[58] Field of Search ......... 317/22, 36 TD, 13 R, 46, 317/31; 307/232

[56] References Cited
UNITED STATES PATENTS

| | | | |
|---|---|---|---|
| 3,584,259 | 6/1971 | Traub | 317/31 |
| 3,633,072 | 1/1972 | Duncan | 317/31 |
| 3,716,718 | 2/1973 | Nowell | 307/232 X |

Primary Examiner—James D. Trammell
Attorney, Agent, or Firm—Ely Silverman

[57] ABSTRACT

Voltage monitoring circuits and components including a coil and electromagnetic core and a reed sensor with the core operated at a very low degree of magnetic saturation and a very small reed switch gap. The reed switch is adjustably located in the magnetic field of the coil and core to provide a highly sensitive as well as adjustable voltage sensing and monitor circuit and action with an extremely small difference between voltage to open the closed circuit and voltage to close the opened circuit.

13 Claims, 17 Drawing Figures

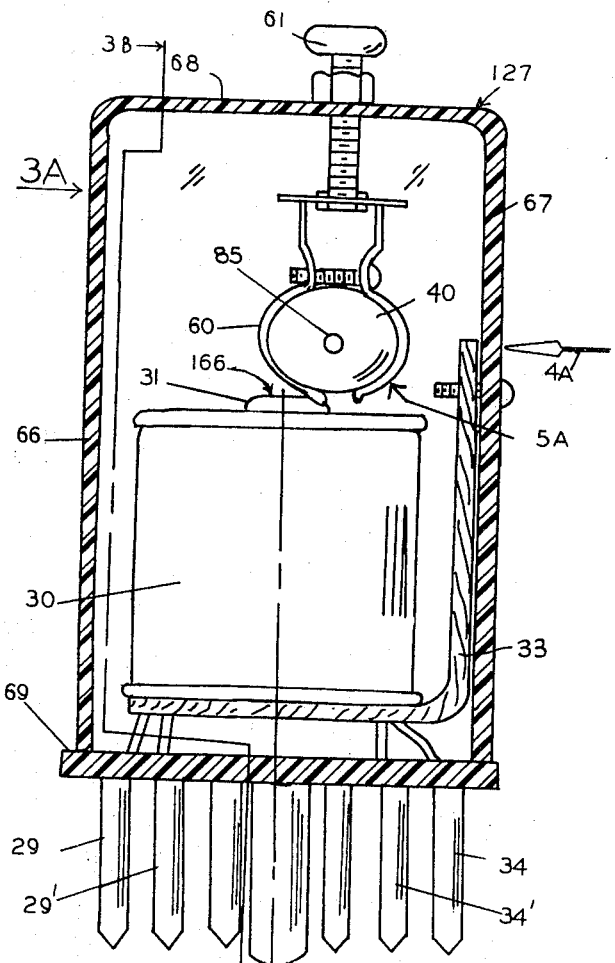
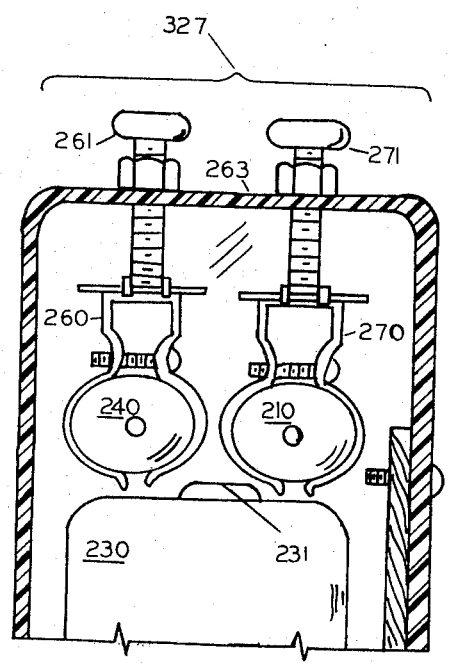
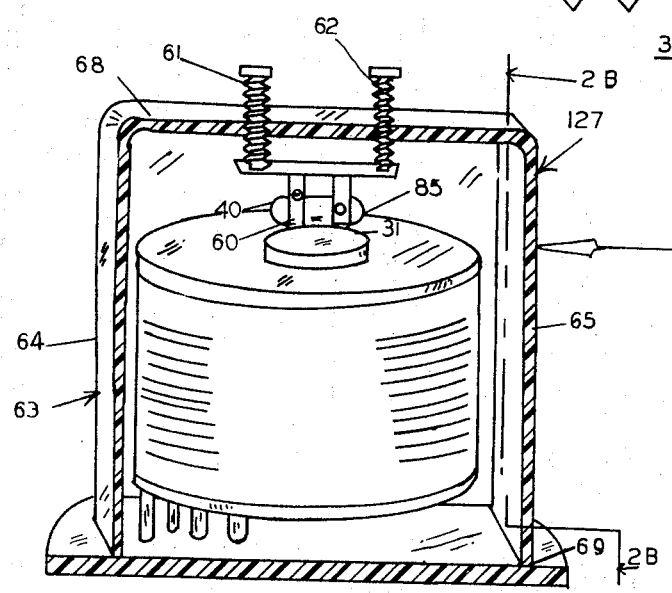

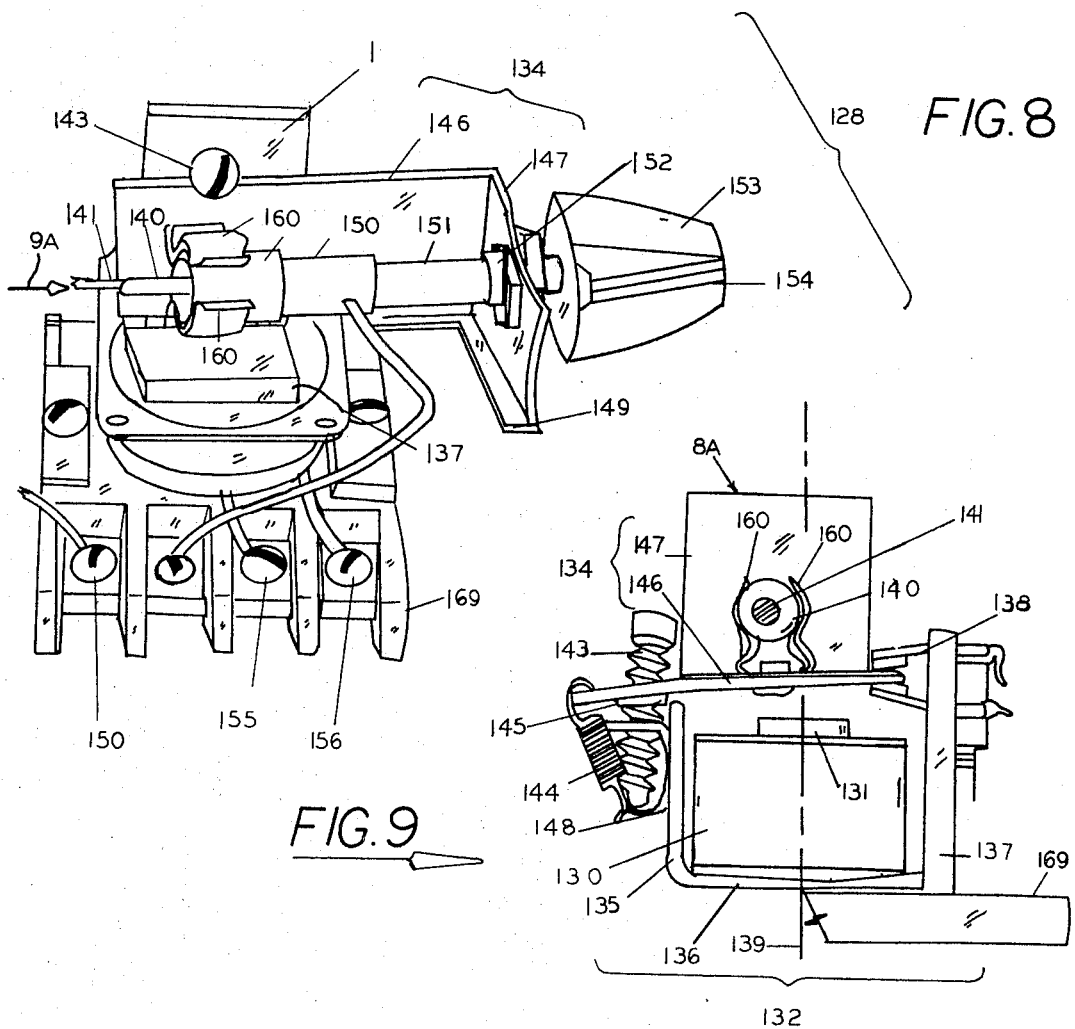

ns,928

VOLTAGE MONITORING SYSTEM

CROSS-REFERENCES TO RELATED APPLICATIONS

This application is a division of my co-pending U.S. Pat. application Ser. No. 346,262, now Pat. No. 3,815,062, filed Mar. 30, 1972, which is a continuation application of my earlier U.S. Pat. application Ser. No. 171,862, now abandoned, filed Aug. 16, 1971, entitled VOLTAGE MONITORING SYSTEM AND PROCESS.

BACKGROUND OF THE INVENTION

1. Field of the Invention

The fields of invention to which this invention pertains are voltage responsive electrical safety and protection systems with subsequent automatic restoration including one phase of polyphase system and including time delay means.

2. Description of the Prior Art

Many conventional overload devices are relatively slow in operation compared with the speed with which electrical equipment must be cut off from the electrical source in order to avoid damage in high voltage situations. Much damage has resulted to electrical and related mechanical equipment because of the inability of conventional voltage overload and underload devices to respond sufficiently rapidly to avoid such damage.

Additionally, conventional electric coil relays of iron core and armature draw in the armature toward the coil when the magnetic flux developed by the monitored voltage or current reaches its predetermined value. The flux applied to such armature increases as the armature distance from the core decreases so that, once the critical value of flux, and concomitant voltage or current is reached the armature is pulled in with increasing force. If the current or voltage being monitored should decrease while the armature is moving from the core and the armature would have moved sufficiently the sensitivity of such coil, core and moving armature to small monitored voltage and current decreases across the coil and concomitnat small flux decrease is negated. If the current or voltage being monitored should increase while the armature is moving away from the coil and the armature would have moved sufficiently away from the core, the sensitivity of such coil, core and moving armature to small voltage and current increases across the coil and concomitant small flux increase is negated. Such electric coil relays are accordingly overly sensitive to spikes and insensitive to and unable to discriminate between such spikes and genuine changes in voltage across the coil by their response to flux change alleged to be a representation of the electric current passing through or voltage impressed across the coil.

Additionally, in the conventional electro-magnetic coil relay once the armature has been brought down to the vicinity of the core, the armature is located at a zone whereat the armature is least sensitive to changes in voltage across the solenoid and flux changes in the core. Hence, a greater change is required to open the relay (or drop out the relay) than is required to "lock in" the armature on the core. The resulting difference between voltage required to open the closed circuit and to close the open circuit through such a switching means results in an inoperative voltage band of varying and large widths. Temperature sensitive voltage protection circuit switches are slow in operation while electronic tube circuit voltage detectors are involved and complicated and correspondingly expensive in order to correct for the extreme sensitivity thereof to variations in short period levels of rectified voltage as well as to changes in the voltage level to which such sensors are intended to respond.

SUMMARY OF THE INVENTION

This apparatus uses the discovery that, at certain small usable zones in the magnetic field of an electromagnet, the rate of change of intensity of the magnetic field is extremely sensitive to rate of change of voltage impressed across the coil of such electromagnet. Field strength characteristics of the changing magnetic field at different points in such field in combination with a particular small sized probe and monitoring circuit and location and variation of location of such probe in such field is utilized to provide a motor protective system of high and adjustably variable sensitivity to change in voltage.

According to this invention, changes in the flux density in the same extremely small zone or point in entire zone or volume of a magnetic field of an electromagnet monitoring a voltage source both open and close a switch; hence, a scalar minimum difference between the monitored voltage or current and the resulting flux required to open and to close the sensor circuit and a very sensitive monitoring operation results which also provides for operative discrimination between "spikes" and genuine changes in monitored voltage levels. The instant system and process is more sturdy and requires less maintenance than the electron tube type monitoring circuits and apparatuses, and is not as sensitive to spike potential changes yet is far more sensitive and rapid and more readily adjustable than the thermal type monitoring apparatuses.

BRIEF DESCRIPTION OF THE DRAWINGS

FIGS. 2 and 3 show an embodiment of reed sensor switch assembly 127 used in FIG. 1 connections, FIG. 2 being a front view along the direction of the arrow 2A of FIG. 3 and partly broken away along section 2B—2B of FIG. 3. FIG. 3 is a side view along the direction of the arrow 2A of FIG. 3 partly broken away along the section 3B—3B of FIG. 2.

FIG. 8 is a front and top oblique view of another reed sensor switch assembly 128 according to this invention along direction of arrow 9A of FIG. 8.

FIG. 9 is a side view of a portion of assembly 128 as seen along the direction of the arrow 9A of FIG. 8.

FIGS. 10, 11, and 12 are diagrammatic representation of the flux line in vicinity of the core of an electromagnet such as shown as 30 and 130 in FIGS. 2, 3, 8 and 9.

FIGS. 13, 14 and 15 are diagrammatic representations of transverse sectional views of the flux lines as seen along the planes 13A, 14A and 15A, respectively, of FIGS. 10, 11 and 12 to show the changes in line of the flux distribution in the zone bounded by the width of the core 31 of the coil 30 and extending axially thereof on change in current through coil 30 and illustrative of the location of the reed switch gap 83 according to this invention.

DESCRIPTION OF THE PREFERRED EMBODIMENTS

Figure 1:
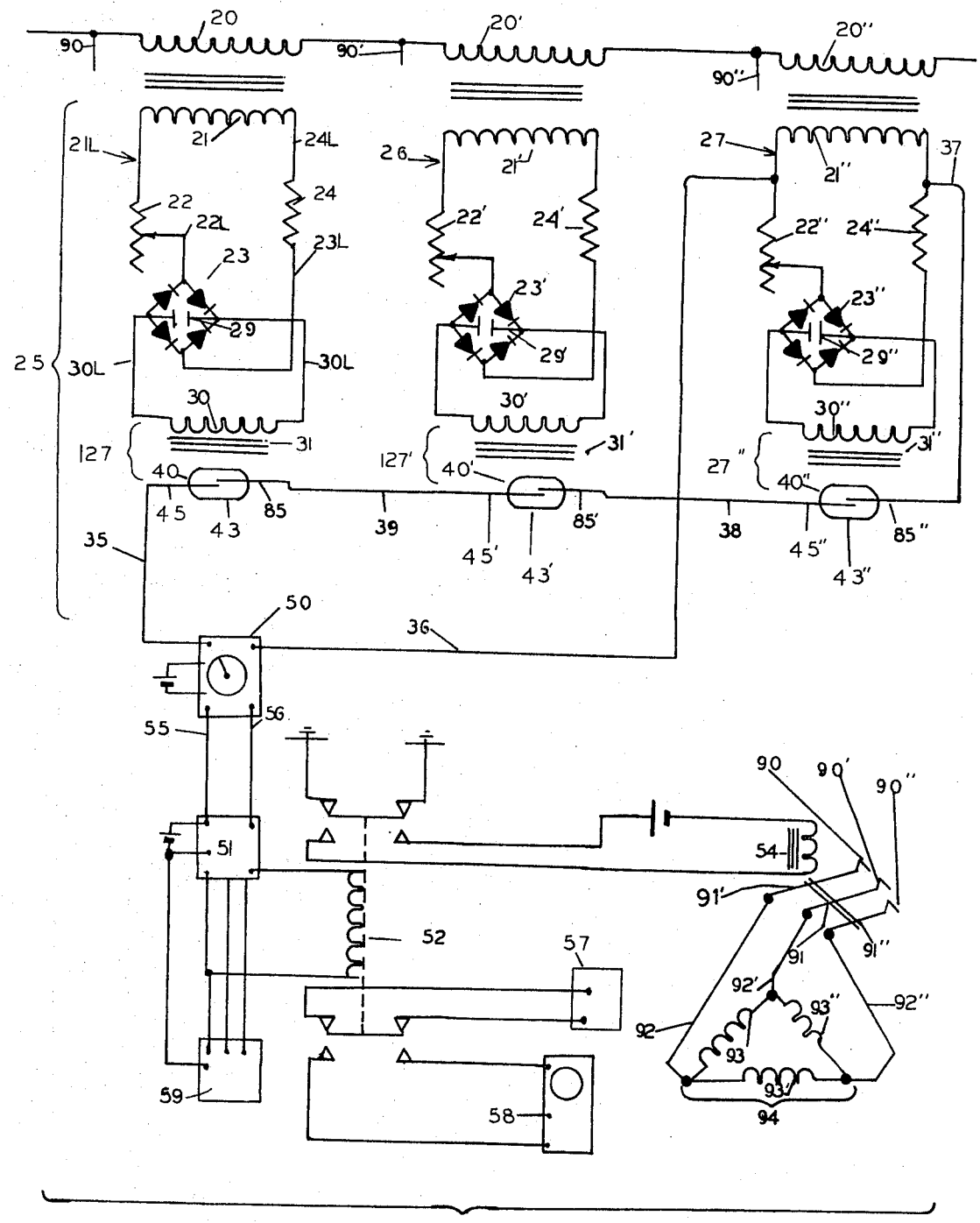
FIG. 1 is a schematic wiring diagram of a voltage monitoring circuit according to this invention, shown deenergized.

One apparatus 28 of this invention diagrammatically set out in the circuit diagram of FIG. 1 comprises a series of three like sensing assemblies 25, 26 and 27 for phase of coil 20, phase of coil 20', and phase of coil 20" of the monitored circuit, respectively, and a first time delay circuit 50, a second time delay circuit 51, an electric relay activated switch 52, a motor control relay 54, an alarm 47, and a recorder 50 in operative connection.

Assembly 25 comprises a primary coil 20, a secondary transformer coil 21, an adjustable potentiometer 22, a rectifier 23 and a resistor 24 and a switching assembly 127 operatively connected as shown. Sensing assembly 26 comprises a primary coil 29', a secondary coil 221', an adjustable potentiometer 22', a rectifier 23' and a resistor 24' and a switching assembly 127' shown in FIG. 1. Assembly 27 comprises a primary coil 20", a secondary coil 21", an adjustable potentiometer 22" a rectifier 23", a switching assembly 127", and a resistor 24". The elements indicated by prime (') and double prime (") as 24' and 24" are identical in structure to the structure similarly numbered but without the prime (') as 24.

Apparatus or system 28 is generally a polyphase three sensor system providing one sensor for each phase. Each assembly as 25 may operate as an individual unit for disconnect or connect of a reed sensor assembly as 40. Each reed switch assembly as 40 is normally open; but, in normal operation current is continuously passing through its associated coil 30 and the reed switch assembly is thereby kept electrically closed when the voltage level is adequate and the system 28 is acting as an undervoltage protector to protect the motor as 94 connected thereto from being subject to an undesired undervoltage.

The monitored coils 20, 20' and 20" connect through leads 90, 90', 90" through a control switch 54. The control switch 54 has switch arms 91, 91' and 91" operatively connected respectively to the power line leads 90, 90', and 90" which are in turn connected to the coils as 93, 93' and 93" of a polyphase motor or motor system 94. The system 28 herein is thus operatively connected to such a motor circuit and provides for protection thereof by actuation of the time delay cut-off switch 51 to control the continuity of electric power from the monitored source to that motor or motor system 94 dependent upon the adequacy of voltage sensed through the assemblies 25 26 and 27 at each of the phases 20, 20', and 20" of that source.

In each asembly as 25, a solenoid coil 30 is located in the switch assembly as 127. The assembly 127 comprises a core 31, coil 30, reed switch assembly 40 and case 63. Coil 30 is connected to the output of the rectifier 23. Such coil 30 in conventional manner circumscribes and is coaxial with a magnetic core 31. The core 31 and the coil 30 form an electromagnet and are supported in conventional manner by a bracket as 33 on a rigid frame 32. The coil is connected by prongs as 34 and 34' to electrical connections for the core while other prongs, as 29 and 29' would provide electrical conductor leads for a reed switch 40, also located in and a part of switch assembly 127.

A rigid yet non-magnetic and electrically non-conductive case 63 comprises a top wall 68, a left wall 64, right wall 65, front wall 66, rear wall 67 and surrounds the coil 30 and assembly 40 and provides a firm support for the reed switch assembly 40 at a position positively spaced away from yet relatively close to the coil 30. The case 63 is firmly attached at its bottom to the prong base 69. A non-magneic, e.g., brass, resilient yet firm support clamp 60 for the reed assembly 40 is firmly yet adjustably suppored from the top wall 68 of the casing 63. The support clamp 60 is attached to the top wall 68 by left and right adjusting screws 61 and 62.

The reed switch assembly 40 compries, in operative combination, a left reed arm 41, a right reed arm 81, a cylindrical rigid imperforate non-magnetic tube wall 43, a left tube seal 42 and a right tube seal 82. The tube wall 43 and the tube seals enclose therebetween a cylindrical tube space 80. The left reed arm 41 has a left arm free end 44 located in the tube space 80 out of contact with tube wall 43. Wall 43 is glass.

The left reed arm 41 comprises a rigid left terminal rod 45 which is connected to a left reed plate 46 and a left reed terminal plate 47 which ends at the left reed arm end or tip 44. The left reed terminal plate 47 is firmly attached to and supports a left contact strip 48.

Figure 7:
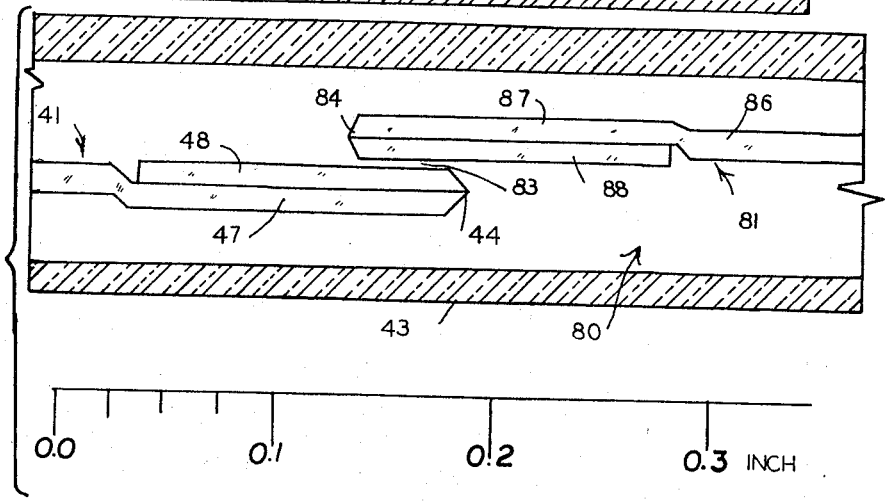

The right reed arm 81 comprises a rigid right reed terminal rod 85, a right reed plate 86, a right reed terminal 87 and right reed contact strip supported on and firmly attached to the right reed terminal plate 87. The right reed terminal plate ends at the right reed arm end or right tip 84 in space 80 out of contact with tube wall 43. A small gap space 83 shown in FIG. 7 is located beween the right contact strip 88 and the left contact strip 48 when the reed switch is open, as shown in FIG. 7. The neighboring faces of strips 88 and 48 are flat and parallel and spaced apart in the normally open switch position of that assembly 40.

The left reed arm rod 45, plate 46, terminal 47 and contact 48 are electrically conductive and continuous and firmly attached in series to each other as shown in FIGS. 4–7. Likewise, the right reed arm components rod 85, plate 86, terminal 87 and contact 88 are electrically conductive and firmly connected to each other in series as shown in FIS. 4–7 and electrically continuous with each other. The left reed arm terminal rod 45 is firmly attached and supported in the left tube seal 42 and the right reed arm terminal rod 85 is firmly attached to and held in the right tube seal 82. Wall 43 is rigid.

In the apparatus 127 the reed switch assembly 40 is located with the gap 83 displaced laterally from the axis 49 of the coil 30 and core 31 although the gap space 83 is located in a plance which plane passes through the axis 49 for greatest sensitivity of the reed switch to the change of electric current through the coil 30. Thus in the assembly 127 shown in FIGS. 2 and 3, the axis 49 of the solenoid coil 30, which is coaxial with the axis of the core 31, does not pass through the gap space 83 of the reed switch 40.

The adjustment screws 61 and 62 provide for vertical adjustment of the location and tilting of the gap space 83 in the magnetic field of coil 30. The screws 61 and 62, on rotation, raise or lower the switch assembly 40 along the plane of those screws to adjust the sensitivity thereof to the changes in current in coil 30 as below described.

In apparatus 28 each of the reed switches as 40, 40' and 40'' of assemblies 25, 26 and 27 are identical in structure and are electrically connected in series with the right (in FIG. 1) terminal rod 85 connected through a lead 39 to the left (in FIG. 1) terminal rod 45' of the reed switch 40', while the right rod 85' of the switch 40' is connected by the lead 38 to the left rod 44'' of the switch 40'', and the right rod 85'' of the reed switch 40'' is connected by lead 37 to one (right in FIG. 1) end of a monitored phase, as the secondary coil 21'' of the assembly 27, while the left rod 45 of the reed switch 40 is connected by lead line 35 to a first time delay switch 50 and that time delay switch 50 is connected through the terminal line 36 to another (left in FIG. 1) end of secondary coil 21'' of phase 27. Accordingly, when switches 40, 40' and 40'' are all closed the time delay switch 50 is not actuated. When the terminals of one switch, as 40, open due to a fall in voltage across the monitored phase, as that of transformer coil 20, the time delay switch 50 is actuated. The time delay switch 50 is a conventional adjustable time delay, the time of action of which is adjustable from 2½ to 5 seconds and maintains its contacts closed for such time notwithstanding the opening of any or all of the switches 40, 40' and 40'' in the series connection as shown in FIG. 1. Leads 55 and 56 are connected from relay 50 to a second time relay 51 which, in the preferred embodiment, has a 60 to 180 second delay. This second time delay switch 51 provides that when there has been a 2½ to 5 second opening through the circuit of sensors 40, 40' and 40'' to trip the time delay switch 50, the pilot control relay 52 is actuated and disconnects a holding coil as 54 and so disconnects a motor circuit 94 protected by assembly 28 for at least 60 to 180 seconds prior to reconnecting via pilot 59 to sources 20, 20', and 20''.

In operation of the system 28, electric power being monitored is connected to the primary side of each transformer, as 20. The corresponding secondary coil voltage is, in the particular embodiment shown arranged to receive 120 volts across leads 21L and 24L and a variable potentiometer 22 of 50,000 ohms maximum capacity is used in each of assemblies 25, 26 and 27. This adjustable potentiometer serves to reduce the voltage from the 120 volt secondary side of the transformer down to approximately 30 volts (effective) alternating current for a delivery to the rectifier 23; rectifier 23 is a full wave rectifier and rectifies the input current from alternating current to direct current and is provided with a 0.3 microfarad condenser (three 0.1 μfd condensers in parallel). In the particular embodiment, the coil 30 is from a Potter and Brumfield KRP 11 DG relay: it has a resistance of 10,000 ohms for a nominal power of 1.2 Watts at 110 volts. Outer diameter of core 30 is ⅞ inch; its height is ½ inch; the outer diameter of core 31 is 5/16 inch and projects 3/32 inch above the bobbin about which the windings of the coil are wound. The reed switch 40 is horizontal. The gap 83 is in a plane in which the longitudinal central axis 49 of the coil 30 and core 31 lies. The gap 83 center point is 5/16 inch above the top surface 166 of the core 31 in a vertical projection of the outer cylindrical surface of core 31. The plane neighboring surfaces 88 and 48 of switch 40 are at 30° to the horizontal, normal to a line extending to the adjacent top surface of the core at 60° to the horizontal. The reed switch is a miniature, center gap switch type MR 107 of GORDOS Corporation, 250 Glenwood Ave., Bloomfield, N.J. Dimensions are shown generally in FIGS. 4 and 7. The contact materials of strips 48 and 88 are of diffused gold of rhodium. The switch assembly 40 is normally open, but a 20 ampere turn magnetic field in the gap 83 closes (pulls in) its contact strips. The reed plates 86 and 46 and 47 and 87 are iron.

Figure 4:
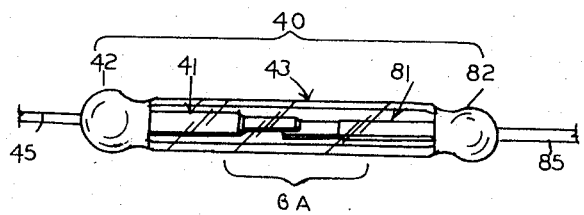
FIG. 4 is an enlarged side view taken along the direction of the arrow 4A of FIG.2 showing a reed sensor switch assembly 40 to scale as used in the assembly of FIGS. 2 and 8.
Figure 5:
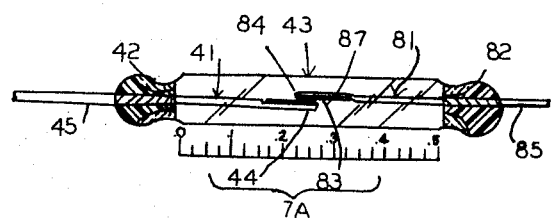
FIG. 5 is a side scale view of assembly 40 taken along the direction of arrow 5A of FIG. 2 and in the plane of the gap 83; it is at the same scale as FIG. 4 and includes a scale of 0.0 to 0.5 inch shown thereon, to show size of parts.
Figure 6:
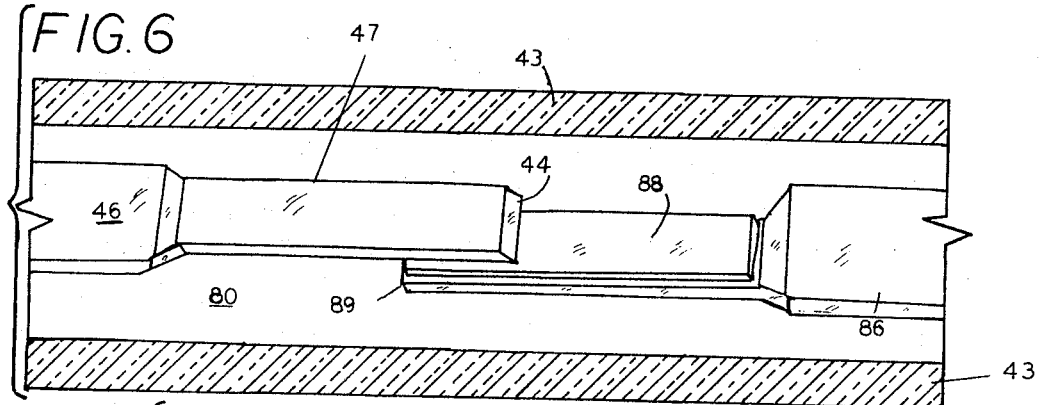
FIGS. 6 and 7 are substantially enlarged views of zones 6A and 7A, respectively, of FIGS. 4 and 5 to scale, with a scale of 0.0 to 0.3 inch included in FIG. 7 to show size of components and of the gap 83.

A very small amount of voltage fed into each coil as 30 acts to close each reed switch as 40. The reed switch is located a specific distance vertically from the top surface of the coil 30 and core 31 as shown in FIG. 4; the gap space 83 of the reed switch is also located slightly displaced from the central axis 49 of the core 31. A lowering of ½ volt (on the potentiometer 22) from voltage level as 110 volts set for minimum application to motor 94 provides that the reed switch 40 opens. The reed switch is "normally open" but by adjustment of potentiometer 22 is kept closed in circuit or system 28 by application to coil 30 of the normal voltage (e.g. 115v) at coil 20 intended to be passed to the motor 94. The amount of voltage drop to be suffered by the coil 20 (or 20' or 20'') without the reed switch 40 (or 49' or 40'') e.g., to 110v opening or "dropping out" is a matter of adjustmnt by the operator and, according to this invention the adjustment may be as sensitive as ±½ volt (110 ±.5) However, the switch 40 is relatively insensitive to "spikes" of less than 100 milli-seconds in the circuit of FIG. 1.

The resistor 24 in the particular embodiment shown is a 56,000 ohm resistor. The potentiometer 22 is a 6,500 ohm variable resistor that may be varied as needed for setting the voltage at which the reed switch is brought to its open position from its closed position on a desired voltage differential, 3.g. 2 volts, for shutting off power from coil 20 to the motor 94. The above particular values of potentiometer 22 and resistor 24 provide that adjustment of the potentiometer to any limit of its range would still be within the safety range for equipment in the field as is now commonly practiced. For instance, when one adjusts potentiometer 22 at its lowest voltage setting which means that on a 480 volt system equipment as 94 would be removed from the line only when there would be a drop to 380 volts. The resistor 24 is a blocking resistor and provide that the operator may not set his equipment to operate at a value below 380 volts and so provides protection to equipment in the field by an inadvertent or unskilled setting.

The magnetic reed sensor 40 is hermetically sealed. Neither dirt nor water nor moisture can get to its contacts and cause them to burn or arc. The reed switch in the particular embodiment shown is set to operate on a 2 ampere operation and would be connected only to a 2 to 5 watt load. The reed sensor has such a clear open and closed action that it might be described as a snap action to make and break (close or open) without any chatter, and is also substantially insensitive to ambient temperature, spikes and high voltage in the circuit being monitored. In the preferred embodiment a ⅛ inch space is provided between the top of the core 31 and the glass tube 43.

When proper voltage has been supplied to phase or coil 90, 90' and 90" and the assemblies 40, 40' and 40" are closed, power is applied to the first time delay switch 50 through the secondary coil 21" of assembly 27. Such continued power to the relay 50 keeps open the circuit therethrouh to restart relay 51. When the circuit to timer relay 50 is broken by any of the reed assemblies 40, 40' or 40" becoming open because of a lowered voltage in the phase (as 90) monitored by the assembly (as 25) of which that reed assembly (as 40) is a part, the timer in the timer relay 50 starts. If, at the end of the period for which the timer 50 is set, the circuit through assembly 40, 40' or 40" is still open, the relay 50 acts through relay 51 to activate the closed normally open safety relay 52 and disconnect the motor circuit locking relay 54 and disconnect motor circuit 94 from power sources 90, 90' and 90" and also start the timer in second or restart timer relay 51 as well as actuate alarm 57 and disconnect the recorder 58.

After 60 seconds or other period such as 180 seconds prescribed for the operation of time delay and restart switch 51, pilot 59 resets switch 51 and closes the safety relay 52 for restarting of the equipment 94 but not before such period. More than one motor or more than one group of motors may be connected to the pilot control swiches 52 and 54.

In reed switch assembly 128 according to this invention, an annular coil 130 is circumferentially located around a magneic cylindrical core 131 and both are co-axialy mounted on a frame 132. Coil 130 and core 132 are idential to coil 30 and core 32 of assembly 127. The frame 132 is formed of nonmagnetic material such as aluminum and comprises, in operative combination, an upstanding left arm 135, a horizonal arm 136 and a vertical right arm 137. One (right as shown in FIG. 9) end of an adjustable arm 132 is pivotally located on a pivot 138 on the vertical arm 137 and that same arm 134 is adjustably supported on its other (left, as shown in FIG. 9) end by an adjustment screw 143 which attaches onto a shoulder 145 of the arm 134 to move the movable (left) end of the arm 134 upward and downward while the lower end of the screw 134 rotatably bears against a laterally extending bracket or ear 148 which is firmly attached to the vertical (left) arm 135 of the base 132. A spring 144 attached to ear 148 and arm 146 elastically limits the movement of the arm 134 upward and helps achieve a firm positioning of the arm 134 relative to the core 131.

The adjustable arm 134 is composed of a rigid horizontally extending flat arm 146 and a rigid verticaly extending flat arm 147. Both arms 146 and 147 are nonmagnetic and firmly joined together and are ribbed as at 149 to provide a firm spatial relationship between those elements 147 and 147.

A pair of like non-magnetic clamp arms 160 and 160' are firmly attached to arm 146. The arms 160 and 160' firmly yet slidably hold a sleeve 150 made of non-magnetic plastic. The sleeve 150 is firmly mounted on the rigid shaft 151. Shaft 151 is made of aluminum and non-magnetic and is slidably and rotatably located in a journal 152, which journal is firmly fixed to the arm 147. The central axis 139 of the coil 130, which axis is also the axis of the cylindrical core 131, does not pass through the center of the reed switch 140, but raher, as is the case with the axis 49 of core 31 of the reed switch assembly 127 shown in FIG. 2 the axis 139 of the coil 130 passes some slight distance away from theline joining the terminal rods (as 41 and 81) of the reed switch 140 and similarly such axis 139, like 49, is displaced from the gap space, as 83, center.

The same reed switch structure shown as 140 in FIG. 8 is provided as is shown as 40 in FIGS. 2 through 6. A different reed switch may be used but the structure dimensions and characteristics are the same for the reed switch 140 as above described for the reed switch 40. The same spatial relationship of the gap space of the reed switch 140 and core of adjacent electromagnet is provided in assembly 128 as in 127. The gap space (as 83) of the reed switch 140 intersects a plane, which plane includes the longitudinal axis (139) of the core 131 and the coil 130, while the longitudinal axis of the reed switch 40 (as well as 140) is also located in a plane which is perpendicular to the axis (139) of the coil (130) and core (131) with which such reed switch is associated.

In the assembly 128 of FIGS. 8 and 9 the shaft 151 has its longitudinal axis co-linear with a line passing through the rods as 45 and 85 and the gap space as 83 of the reed switch as 140 attached thereto. Shaft 151 is rotated by handle 153, with its position indicated by pointer 154 against a scale on flat arm 147.

The orientation of the contact plates as 84 and 44 adjacent the gap as 83 relative to the axis 139 of the core 131 and coil 130 may accordingly be finely adjusted. Additionally, the shaft 151 may be moved axially; that is, back and forth, to the left and to the right as shown in FIG. 8, in the magneic field of the coil 30 and core 31.

FIGS. 10, 11 and 12 diagrammatically show the operation of the reed relays as used in the switch assemblies 128 and 27 according to this invention with the current through coil 30 largest in FIG. 10 and smallest in FIG. 12, and intermediate in FIG. 11. In these figures, the coil 30 wires are shown with the "$x$" indicating an electron flow toward the plane of the page and the dot (⊙) indicating flow of electrons out of the page. The axis 49 of the core 31 is co-axial with the axis of the coil 30. The same relation exists with core 131 and coil 130 as to the axis 139. In the FIGS. 10 through 15 the lines of fluxx 100, 101, 104 and 103 are shown in conventional manner. At a given total magnetic field strength, the field strength is only relatively uniform coming out of the upper and lower core faces 166 and 167, respectively. In the field of the circular coil 30, the short loops, as 100 and 101, which are close to the wires of the coil 30 provide stronger magnetic fields than do the long loops 102, 103, and 104.

FIGS. 13, 14 and 15 are diagrammatic representations of the differing densities of the lines of flux in FIGS. 10, 11 and 12 relative to the location of the gap space 83 of the reed switch as 40. The same relations occur on the reed switch 140. As diagrammatically shown, the reed switch 40 is located with its air gap 83 at a position whereat a very small change in current through coil 30, and the monitored voltage as 20, creates a large change in flux at the point at which the air gap 83 is located. The open and close reaction of the reed switch 40 and therefore the entire circuit 28, single assembly 127, and the single assembly 128 is accordingly sensitive to such small changes in monitored voltage.

The apparatus 127 of FIG. 2 provides that the adjustment screws 61 and 62 may raise and lower the reed switch 40 from its position of its maximum sensitivity to change in voltage across coil 30 (and hence coil 21 and 20) to a position whereat it is less sensitive to the change in impressed voltage across the coil 30. The orientation of the contacting surfaces of contact plates 48 and 88 of the reed switch 40 which contact when open is arranged (as shown in FIG. 4 as viewed along the direction of the arrow 4A of FIG. 2) with the parallel planes of those flat contact surfaces of those plates 48 and 88 normal to the direction of lines of flux passing through the gap space 83.

The reed sensor assembly 128 provides that the reed switch 140 is located with the gap space thereof 83 between the ends of the arms of the reed switch at a fixed distance (by adjustment screw 143) from the top face of the core as 131 as well as at a fixed location spaced away from the axis 139 of the core 131 and the coil 130. This arrangement of assembly 128 provides that the contacting plates as 88 and 48 on the reed arms as 81 and 41. respectively, may be rotated about the axis of the shaft 151. The axis of the shaft 151 is perpendicular to the longitudinal axis 139 of the core 131 of the coil 130. Accordingly, the sensitivity of the reed switch 140 to changes in voltage through the coil 130 may be reduced by bringing the planes of the surfaces of contact elements as 88 and 48 towards parallelism to the line of flux passing through the gap space as 83 there-between in the open position of such contacts; the handle 153 is principally used to rotate the contact plates as 88 and 48 so that the plane of such plates is normal to or parallel to the lines of flux passing through the gap space, and also to positions intermediate between such transverse or parallel orientation of the plane of the gap space for the desired sensitivity of the reed switch, as well as move the reed switch axially.

Because of the very small volume of the gap space, it acts as a particularly sensitive magnetic field proble and, because of the lack of uniformity of the field strength and the movement of the strongest portions of the field relative to the reed coil, on small change of voltage across the coil 30, the reed coil is either "on" "off" and this system of assembly 127, 128 as well as 25, 26, and 27 is sensitive to changes in the voltage to be monitored to close or open relay 50.

FIGS. 13, 14 and 15 diagrammatically shown the position change of lines of flux on change in current to the coil 30 relative to the location of the gap 83 to show that the fixed location of the small volume gap 83 at a postion of particularly sharp change in vector quantity of the magnetic field provides a particularly sensitive system for reliably proecting motor circuit from small voltage differentials that may be very delicately set and, also, provides that the voltage to the motor system as 94 is promptly brought back to operative connection without a large differential in the voltage required to make or close the theretofore broken contact through the theretofore open switch.

In the assemblies 127 and 128, either of which may be used in circuit 28, the core and coil combination is operated at a voltage value—about 27 volts to 30 volts—far below its intended capacity (115 volts A.C.).

The core 31 is intended for use with direct current and has a sufficiently low magnetic hysteresis and remanence to provide a total magnetic flux which changes directly with and extremely sensitive to change in direct current through the coil 30; also, the resulting distribution of flux in core 31, because of the lack of magnetic saturation of the core 31 accentuates the theoretical diference in intensity of flux from the central longitudinal axis of the cylindrical core 31 to the cylindrical periphery thereof provided by the surrounding coil 30, along a radius of the core face, as 106.

This coil and core combination, in the circuit 28 and assemblies 127 and 128 shown, whereat the coil and low remanence core are operated far below their rated capacities, the movement of the flux lines, as 101, 102, 103 and 104, (each indicting a magnetic field of given intensity) centrally of the core faces 165 and 166 as well as increasing in number, as diagrammatically shown in FIGS. 10-15, on increase in current through the coil 30 provides a magnetic effect in the relatively as well as absolutely small zone of the gap as 83 of the reed switch as 40 this effect is reliable as well as sensitive to changes of current through the coil 30 when gap 83 is located, as shown, at a point displaced from the central longitudinal axis of the cylindrical core 31, and axially displaced from the end as 165 or 166 of such core, yet within the extension of the cylindrical periipheral cylindrical outline of the core. The size of the reed switch components adjacent gap 83 are shown to scale in FIGS. 4, 5, 6, 7, 8 and 9 with scale graduated in tenths of an inch (0.0 to 0.5 inch) in FIG. 5, and (0.0 to 0.3 inche) in FIG. 7 to illustrate that the size of the gap 83 is about 0.05 × 0.05 × 0.004 while the pole forces are 5/16 inch diameter. Accordingly, the gap 83 of the reed switch is readily located in a zone beyond the outline of the core as 31 or 131, yet between an extension of the central longitudinal axis of that core and an extension of the peripheral outline thereof (or slightly lateral of such outline) within which zone the magentic field intensity changes with and is sensitive to small changes in current through the coil 30 actuating such core. The reed switch chosen, as 40, is one which opens and closes in a field of the (ampere turns) intensity provided by the changing magneic field provided by such current in response to the changes in magneic field concomitant on the desired monetoring sensitivity of the assembly as 127 or 128 in a circuit as 28 to monitor phases, as 20, 20' and 20'' for application to a motor or motor circuit as 94.

The width of the gap space 83 as measured along the length of the reed arm, as 41 from the arm end 44 to the arm end 84 is only 0.05 inch maximum; the length over the gap is only 0.004 inch. The diameter of the core as 31 is 5/16 inch (0.3125). As the core 31 is cylindrical, the radius along which the magnetic field flux density or magnetic field intensity increases and decreases as abovve described with change in current through coil 30 is at least three times the gap space width and the gap space width is accordingly less than one-third of the radius of the core end so that the free arm ends, as 44 and 84, of the reed switch assembly, as 127 and/or 28, may be adequately sensitive to the changes in the adequately small zone or volume of the magnetic field developed by the core 31 which changes accurately and closely reflects the change in current through coil 30 used to monitor the voltage across the phases as 20, 20' and 20'' applied to the motor circuit 94 through the leads 90, 90' and 90" (and 220, 220' and 220").

Figure 16:
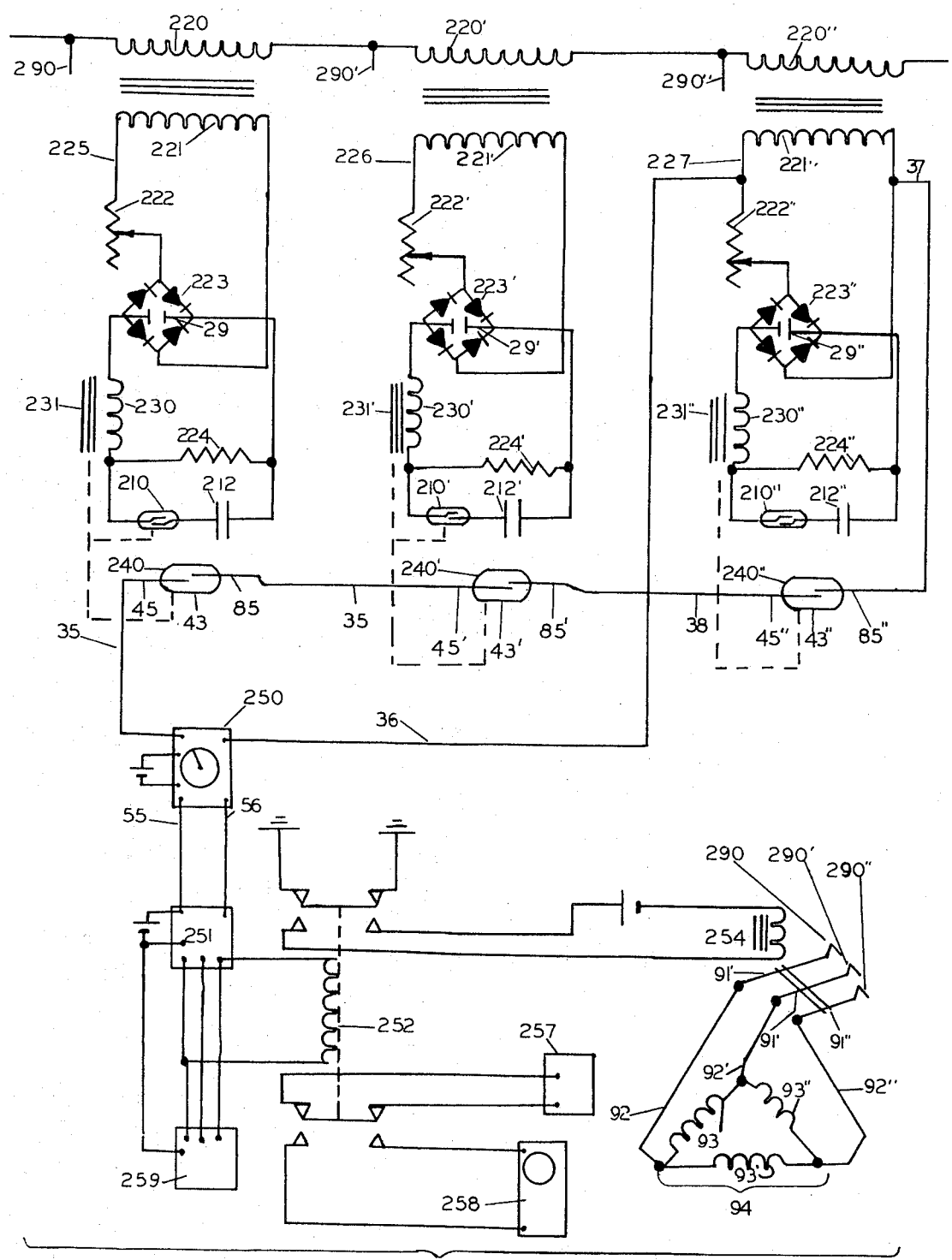
FIG. 16 is a schematic wiring diagram of another apparatus according to this invention and FIG. 17 a switch therefor.

Another apparatus 228 of this invention diagrammatically set out in the circuit diagram of FIG. 16 comprises a series of three like sensing assemblies 225, 226 and 227 for phase of coil 220, phase of coil 220', and phase of coil 220" of the monitored circuit, respectively, and a first time delay circuit 250, a second time delay relay 251, as 51 in apparatus 28; an electric relay activated switch 252, as 52 in apparatus 28; a motor control relay 254, like 54 in apparatus 28; and an alarm 257, and a recorder 258 in operative connection as in apparatus 28.

Assembly 225 comprises a primary coil 220, a secondary transformer coil 221, an adjustable potentiometer 222, a rectifier 223 and a resistor 224, a condenser 212 and a compound sensor assembly 327, operatively connected as shown in FIGS. 16 and 17. Assembly 226 comprises a primary coil 220', a secondary coil 221', an adjustable potentiometer 222', a rectifier 223' and a resistor 224' a condenser 212' and a switching assembly 327'. Assembly 227 comprises a primary coil 220", a secondary coil 221", an adjustable potentiometer 222", a condenser 212", a switching assembly 327" and a resistor 224".

The elements indicted by prime (') and double prime (") as 224' and 224" are identical in structure to the structures similarly numbered but without prime ('), as 224.

Apparatus or system 228 is generally a polyphase three sensor system providing one sensor for each phase. Each assembly as 225 may operate as an individual unit for disconnect or connect of a reed sensor assembly as 240 and 212 are normally open; but, in normal operation, current is continuously passing through its associated coil 230 and the reed switch assembly is thereby kept electrically closed when the voltage level is adequate and the system 228 is acting as an undervoltage protector to protect the motor as 94 connected thereto from being subject to an undesired undervoltage.

The monitored primary coil 220, 220' and 220" connect to power leads 290, 290' and 290" through a control switch 254. The control switch 254 has switch arms 91, 91' and 91" operatively connected respectively to the power line leads 290, 290' and 290" and to electrical leads as 92, 92' and 92" which are in turn connected to the coils as 93, 93' and 93" of a polyphase motor or motor system 94. The system 228 herein is thus operatively connected to such a motor circuit and provides for protection thereof by actuation of the time delay cut-off switch 251 to control the continuity of electric power from the monitored source to that motor or motor system 94 dependent upon the adequacy of voltage sensed through the assemblies 225, 226 and 227 at each of the phases 220, 220' and 220" of that source.

The operation of relays 250, 251, 252, 254 and 259 for connection and disconnection of the motor circuit 94 and of alarm 257 and recorder 258 are as above described for relays 50, 51, 52, 54 and 59 respectively in assembly 28, with switch assemblies 240, 240' and 240" substituted for assemblies 40, 40' and 40" in assembly 28.

Assembly 327, shown in FIG. 17, comprises the coil 230 and core 231, respectively identical to 30 and 31 of assembly 127 and core 263 like 63, but with two like reed sensor assemblies instead of one; i.e., reed switches 240 and 210, each identical to 40, and corresponding adjustment means, 260, 261 and 262 as 60, 61 and 62 of assembly 127 and also 270, 271 and 272 like 260, 261 and 262. The gap of reed switch 260 is located in electrical series with condenser 212 and in parallel with resistor 224, both resistor and condenser in series with coil 230 as in FIG. 16. The gap of reed switch 240 is located relative to the coil and core axis, as 49, of the adjacent core, as 231 as above described for switch assembly 40 relative to core 31 and coil 30. The gap of reed switch assembly 210 is located substantially mirror image symmetrically with assembly 240 on opposite side of the axis 49, as shown in FIG. 17, but with a slightly greater sensitivity (adjusted as above described for assembly 127) to voltage change than reed switch 240 in circuit with the relay 250.

The coil 30, core 31 and reed switch assemblies 240 and 210 in assembly 327 are located and cooperate as in assembly 127; however, in circuit 228 a second switch 210, like 40 is located in the case 63 of assembly 127 and it is disconnected and connected in response to change in coltage across the coil 230, as in assembly 28 (but with a slightly more sensitivity to voltage change than 240.

In the particular embodiment shown in FIG. 16 the capacitors and resistances are thus arranged to particularly drive the transformer coil to prevent its closing and make it less sensitive to a temporary spike, whether a negative or positive increment, over what is required for normal operating of the motor 94.

On brief or momentary fall of voltage in the monitored voltage that might lead to opening of the previously closed reed switch as 240 (240' or 240") and, concurrently 210 (and 210' and 210", respectively) the corresponding previously charged condenser as 212 (or 212' and 212", respectively) opens the more sensitive reed switch 210 (or 210' or 210") and drives current through the resistor 224 (or 224' and 224", respectively) in the same direction current had previously passed through the coil 230 and prevents "spikes" or temporary very brief voltage changes from opening the circuit to the relay 251. The change in this sensor assembly 327 sensitivity from a minus 30° and below 0°F. to 200°F. is less than 1/20 of 1 volt measured on a oscilloscope and vacuum tube volt meter.

It is within the scope of this invention that the magnet and reed sensor assemblies, 127, 128 and 327 may be sold separately as overload relay switch for protecting equipment, especially in locked rotor conditions for use, e.g., over a wide range of different frequency alternating currents and in assemblies as 28 and 228. The reed switch assemblies 127, 128, and 327 may be used in gaseous atmospheres or other areas that require an explosion proof contact as well as for operations requiring submersion in oil

I claim:

1. Process of monitoring a voltage power source for a motor circuit comprising steps of
   a. passing a fixed portion of the monitored voltage to a solenoid coil surrounding a magnetically permeable core and developing within said core a magnetic field less than the saturation value thereof,
   b. increasing and decreasing the magnetic field intensity in a direction parallel to the direction from the periphery of said core to the axis thereof responsive to changes in current through said coil, c. sensing changes in magnetic field of said core at a particular small zone thereof by moving magnetically sensitive free arm ends located across a small gap space responsive to such changes while maintaining the position of the center of said gap between such arms and in said zone unchanged in position and spaced away from the axis of the core and spaced away from the ends of said core during operation of said arms, d. opening and closing an electrical circuit through the free ends of said arms in response to changes in current through said coil, e. disconnecting power from said motor circuit in response to a changing voltage of said monitored circuit more than a predetermined amount and reconnecting power to said motor circuit in response to a voltage changed less than the predetermined amount.

2. Process as in claim 1 including the step of rotating said free arm ends about an axis passing through said gap and parallel to the length of said arms to adjust said response of said free arm ends to said changes in the magnetic field in said zone.

3. Process as in claim 1 including the step of moving the position of the center of said gap between said arms in a direction parallel to the axis of said core to adjust said response of said free arm ends to said changes in magnetic field intensity in said zone.

4. Process as in claim 2 including the step of moving the position of the center of said gap between said arms in the direction of a straight line passing through said gap and parallel to the direction of distance between the free ends of said arms to adjust said response of said free arm ends to changes in current through said coil.

5. Process as in claim 2 including the step of changing the proportion of monitored voltage applied to such coil by connecting the coil to said monitored voltage through a variable resistor and adjusting the voltage applied to said coil by varying the value of said adjustable resistor to change the response of said free arm ends to differing ranges of voltage.

6. Process as in claim 5 wherein the monitored voltage is an alternating voltage and the monitored voltage is rectified prior to passage to said solenoid coil.

7. Process as in claim 1 wherein the response of the free arm ends to a decrease in current through said coil is to open an electrical circuit through said arms when theretofore closed and the response of the free arm ends to an increase in current through said coil is to close an electrical circuit through said arms when theretofore open and the scalar amount of said decrease and the scaler amount of said increases are the same.

8. Process as in claim 6 wherein the monitored voltage is applied to said rectifier and adjustable resister and coil through a secondary coil of a transformer at a usual voltage of a 3 volt band width in range of 110 to 120 volts and the open circuit through the free ends of said arms is closed and the closed circuit through said open circuit is opened on a change of 5 plus or minus ½ volt through said secondary coil.

9. Process as in claim 1 wherein said solenoid is in series with a condenser and a resistor connected in parallel and said opening and closing of an electrical circuit occurs between said solenoid coil and said condenser, and a rectifying step is performed between said parallel connected resistor and condenser and said coil and said passing of a fixed portion of monitored voltage to said coil charges said condenser;

and, on said opening of said circuit through said free ends of said arms, passing current through said coil from said condenser in the same direction as current passed through said core when when charging said condenser and opening and closing another circuit in response to the current in said coil;

and disconnecting and connecting said source of power and said motor circuit in response to change in current in said another circuit.

10. In an electrical assembly for monitoring a source of voltage connected by switching means to a voltage sensitive electrically powered apparatus a. a voltage sensing assembly connected to said source of voltage, b. a first time delay relay connected to and actuated by the voltage sensing assembly and connected to means to disconnect the apparatus from said voltage source, and c. a second time delay comprising means to reconnect said apparatus to said voltage source.

said voltage sensing assembly comprising 1. a solenoid coil, said solenoid coil connected to the voltage source being monitored, 2. a magnetic core within said coil, said core having an outer core side surface extending parallel to the length of said core and near to said core and two core end surfaces extending transverse to the core length whereby electric current passing through said coil develops a magnetic field through said core, said solenoid coil and said core having a common longitudinal axis, 3. a reed switch comprising a rigid reed arm support and reed arms, one end of each reed arm supported on said support and its other end being a free end, the free ends of said arms being juxtaposed, and a gap space between said free ends of said reed arms, said gap having a width parallel to one of said arms and a length transverse thereto, 4. means holding said reed switch with said gap space spaced away from said core in a zone exterior to and beyond one end of said core meaured along said common longitudinal axis and spaced away from the measured of said axis in a direction transverse to said axis, said gap space having a width measured along the length of one of the reed arms, the maximum distance along said width being substantially smaller than the width of said core end, said core end width being measured transverse to said common longitudinal axis, the distance across said gap space length between the free ends of the reed arms being, when open, smaller than the distance from said gap space to the neighboring end of said core, 5. the lengths of said reed switch arms lying in a first flat plane which passes through said gap space and said length in the direction of the width of said gap space, said gap space having a length extending in a second plane perpendicular to said first plane, said reed arm switch free ends being movable by magnetic flux through said gap space along the length of said width and its location relative to the common longitudinal axis of said coil and of said core end remains unchanged in position during the open and the closed position of said reed switch, said reed switch being responsive to small changes in said current passing through said coil, and wherein said gap space is located within a zone bounded laterally by a surface which is a projection of the outer surface of said core and which zone extends beyond the end of said core measured along said common longitudinal axis, and wherein, on passage of electric current through said coil, magnetic flux emanates from at least one end of said core and said gap space intersects lines of magnetic flux emanating from said core, and (a) said gap space is located in a plane which plane includes the said common longitudinal axis of said core and coil, and (b) said first plane and said second plane intersect along a line perpendicular to said axis of said core, and including also means to move said reed switch parallel to the direction of the axis of said coil.

11. In an electrical assembly for monitoring a source of voltage connected by switching means to a voltage sensitive elecrically powered apparatus
   a. a voltage sensing assembly connected to said source of voltage,
   b. a first time delay relay connected to and actuated by the voltage sensing assembly and connected to means to disconnect the apparatus from said voltage source, and
   c. a second time delay relay comprising means to reconnect said apparatus to said voltage source
   said voltage sensing assembly comprising
     1 a solenoid coil, said solenoid coil connected to the voltage source being monitored,
     2. a magnetic core within said coil, said core having an outer core side surface extending parallel to the length of said core and near to said core and two core end surfaces extending transverse to the core length whereby electric current passing through said coil develops a magnetic field through said core, said solenoid coil and said core having a common longitudinal axis,
     3. a reed switch comprising a rigid reed arm support and reed arms, one end of each reed arm supported on said support and its other end being a free end, the free ends of said arms being juxtaposed, and a gap space between said free ends of said reed arms, said gap having a width parallel to one of said arms and a length transverse thereto,
     4. means holding said reed switch with said gap space spaced away from said core in a zone exterior to and beyond one end of said core measured along said common longitudinal axis and spaced away from the projection of said axis in a direction transverse to said axis, said gap space having a width measured along the length of one of the reed arms, the maximum distance along said width being substantially smaller than the width of said core end, said core end width being measured transverse to said common longitudinal axis, the distance across said gap space length between the free ends of the reed arms being, when open, smaller than the distance from said gap space to the neighboring end of said core,
     5. the lengths of said reed switch arms lying in a first flat plane which passes through said gap space and said length in the direction of the width of said gap space, said gap space having a length extending in a second plane perpendicular to said first plane, said reed arm switch free ends being movable by magnetic flux through said gap space along the length of said width and its location to the common longitudinal axis of said coil and of said coil and of said core end remains unchanged in position during the open and the closed position of said reed switch, said reed switch being responsive to small changes in said current passing through said coil, and wherein said gap space is located within a zone bounded laterally by a surface which is a projection of the outer surface of said core and which zone extends beyond the end of said core measured along said common longitudinal axis, and wherein, on passage of electric current through said coil, magnetic flux emanates from at least one end of said core and said gap space intersects lines of magnetic flux emanating from said core, and wherein the gap space width measured along the length of one of the reed arms is less than one-third of the width of said core end and said core is magnetically unsaturated during the entire period while said electric current passes through said coil, and (a) said gap space is located in a plane which plane includes the said common longitudinal axis of said core and coil, and (b) said first plane and said second plane intersect along a line perpendicular to said axis of said core, and including also means to move said reed switch parallel to the direction of the axis of said coil.

12. Apparatus as in claim 11 including means to rotate said reed switch along the line of intersection of said first and said second planes while the spatial relation of said line of intersection to the longitudinal axis of said core is unchanged.

13. Apparatus as in claim 12 including an adjustable potentiometer connected in series with said coil and with said voltage source being monitored.

* * * * *